United States Patent [19]

Han et al.

[11] Patent Number: 4,543,796
[45] Date of Patent: Oct. 1, 1985

[54] CONTROL AND METHOD FOR TEMPERING SUPPLY AIR

[75] Inventors: Doyoung Han, La Crosse; William G. Hansen, West Salem, both of Wis.

[73] Assignee: American Standard Inc., New York, N.Y.

[21] Appl. No.: 621,298

[22] Filed: Jun. 15, 1984

[51] Int. Cl.[4] ............................................. F24F 7/00
[52] U.S. Cl. ........................................ 62/160; 62/175; 62/209; 236/49
[58] Field of Search ................. 236/49, 91 F; 165/16; 62/160, 175, 209, 228.4, 228.5

[56] References Cited

U.S. PATENT DOCUMENTS 4,384,462  5/1983  Overman et al. ................... 62/175
4,408,713 10/1983  Iidima et al. .......................... 236/49
4,471,632  9/1984  Nishi et al. ......................... 62/228.5

*Primary Examiner*—William E. Wayner
*Attorney, Agent, or Firm*—Ronald M. Anderson; Carl M. Lewis

[57] ABSTRACT

A microprocessor based control for tempering supply air in a multi-stage temperature conditioning system. The temperature conditioning stages are normally controlled in response to a comfort temperature sensor to maintain the zone at a setpoint. However, if a sensor in the supply airstream indicates that the temperature of the supply air is less than a predetermined minimum, the primary control algorithm is overridden and the temperature conditioning stages are controlled to increase the supply air temperature. Tempering the supply air prevents personal discomfort due to excessively cold air being supplied to the zone.

25 Claims, 4 Drawing Figures

CONTROL AND METHOD FOR TEMPERING SUPPLY AIR

TECHNICAL FIELD

This invention generally pertains to a control for a variable capacity temperature conditioning system, and specifically to a control that is normally operative to vary the capacity of the system to maintain a comfort zone at a setpoint temperature.

BACKGROUND ART

The prior art includes numerous designs for temperature conditioning system controls that are directed to maintaining a zone at a comfortable temperature. The simplest control available for this purpose is a bi-metallic thermostat that is disposed within the comfort zone to energize one or more stages of temperature conditioning when the zone temperature deviates from a setpoint. Alternatively, the temperature conditioning capacity of a system may be varied in proportion to the difference between the zone temperature and the setpoint, as for example, by varying the speed of a refrigerant compressor used in heating or cooling the zone. Regardless of whether the temperature conditioning conditioning system includes one or more discrete stages, or its capacity is smoothly variable, this type control changes system capacity primarily in response to the comfort zone temperature. The temperature of the conditioned air supplied to the zone is generally allowed to rise or fall as required to satisfy the zone temperature conditioning demand.

There are also temperature conditioning systems in which the capacity of the system is controlled to provide a generally constant supply air temperature. The temperature within the zone is maintained at a setpoint using a flow regulator to adjust the volume of air conditioned to a substantially constant temperature, that is supplied to the zone. This type system is thus commonly referred to as a variable air volume (VAV) system, in contrast to the more conventional systems in which the flow of conditioned air is substantially constant.

Under certain conditions, both the constant volume and VAV systems can cause people in the comfort zone to experience uncomfortably cold drafts. For example, this may occur if the outdoor ambient temperature is relatively hot, resulting in a high demand for zone cooling. In attempting to maintain the comfort zone at the setpoint, a VAV system normally responds to the increased cooling demand by discharging 50°-55° F. supply air into the zone at very high airflow rates. A constant volume system likewise responds to an increased cooling demand by greatly increasing the capacity of the system causing very cold air, e.g., 35°-40° F., to be discharged into the zone. People directly exposed to the high velocity supply air in a VAV system or to the very cold supply air discharged from a constant volume system easily become chilled—even though a thermostat mounted in the zone away from the supply airstream discharge still has an unsatisfied cooling demand.

Conversely, in a heating mode, the minimum ventilation requirements for the zone may allow very cold ambient air from an outdoor air economizer to enter the supply airstream and cause discomfort to personnel in the zone. This is more likely to happen when the zone has a minimal heating demand and the percentage of cold outdoor air entering the zone is high due either to legal building code requirements for minimum ventilation or to the extensive use of high capacity exhaust fans, e.g., over restaurant grills or in paint booths.

In consideration thereof, it is an object of this invention to control a variable capacity temperature conditioning system to temper the air supplied to a comfort zone to prevent personnel in the zone being chilled by excessively cold supply air.

It is a further object to provide a supply air temperating control for a system operating in a heating and/or a cooling mode.

A still further object is to control the capacity of the temperature conditioning system to maintain the comfort zone at a setpoint, unless the supply air temperature drops below a predetermined minimum.

Yet a further object is to control the system to increase the supply air temperature if it should fall below the minimum, without causing the comfort zone temperature to rise more than a predetermined increment above the setpoint temperature.

These other objects of the invention will be apparent from the attached drawings and the description of the preferred embodiment that follows hereinbelow.

SUMMARY OF THE INVENTION

A control for tempering air supplied to a comfort zone by a temperature conditioning system. The capacity of the system is normally varied to maintain the comfort zone at a setpoint temperature. Primary control means responsive to a comfort zone temperature sensor are included for controlling the capacity in this manner.

Secondary control means responsive to a supply air temperature sensor are operative to override the primary control means and to control the capacity of the temperature conditioning system to increase the supply air temperature if it should fall below a predetermined minimum value. The secondary control means are effective to temper supply air when the system is operating in either a heating or a cooling mode. Also claimed is a method for thus tempering the supply air in such a system.

DESCRIPTION OF THE PREFERRED EMBODIMENT

Figure 1:
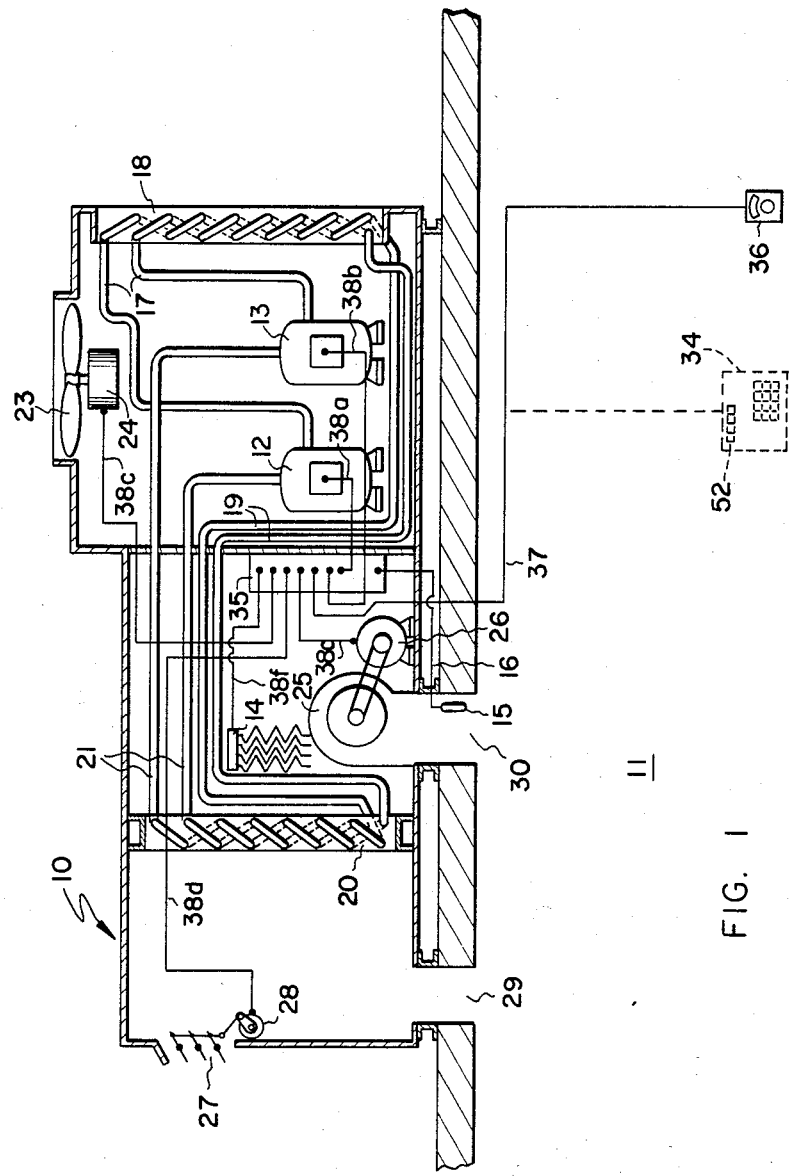
FIG. 1 is a schematic diagram of a temperature conditioning system incorporatng the subject supply air tempering control.

With reference FIG. 1, a temperature conditioning system incorporating the control of the subject invention is generally denoted by reference numeral 10. Temperature conditioning system 10 is a multi-stage system installed as a rooftop unit for temperature conditioning a comfort zone 11. System 10 comprises a first two-stage compressor 12 and a second two-stage compressor 13; either compressor 12 or 13 may be selectively energized, with one or both stages of each compressor operative in a cooling mode to meet a temperature conditioning demand. Thus, in the preferred embodiment, four stages of cooling are available.

Temperature conditioning system 10 may also be selectively operated in a heating mode; the mode is determined by the relative magnitude of the temperature in zone 11 and the heating and cooling setpoints for the zone. In the cooling mode, refrigerant discharged by compressor 12 and 13 flows through refrigerant lines 17 to condenser 18. As the compressed refrigerant flows through condenser 18, it is placed in heat transfer relationship with cooler outdoor ambient air, thereby causing the compressed refrigerant to be condensed to a liquid. The liquid refrigerant flows through refrigerant lines 19 to evaporator 20, passing through an expansion device (not shown) along the way. The refrigerant is vaporized as it expands in evaporator 10, thus cooling the air flowing into the comfort zone 11. Refrigerant vapor returns through lines 21 to the suction side of compressors 12 and 13.

In the heating mode, each of four resistance heating elements 14 may be selectively energized to heat air flowing through evaporator 10 (which is then inactive as a heat exchanger). The air is heated as it passes over the heating elements 14 and into zone 11. Alternatively, heat might also be provided by a fossil fuel burner (not shown) having a plurality of stages. Electric resistance heating is shown in FIG. 1 as best illustrating the application of the invention to a multi-stage system. Temperature conditioning system 10 thus functions in a conventional manner to selectively heat or cool air supplied to comfort zone 11.

In order to achieve efficient heat transfer with outdoor ambient air, fan 23 driven by motor 24 pulls air through the condenser 18 and expels it through the top of the unit. Likewise, air is circulated through evaporator 20 and into comfort zone 11 by means of centrifugal fan 25 driven by electric motor 26.

An economizer damper 27 with actuator 28 is included to modulate the flow of fresh outdoor air into system 10 from a minimum flow level sufficient to meet building ventilation requirements, to a full flow condition. The economizer permits low cost cooling of zone 11 by proportional use of outdoor ambient air when its temperature and humidity are within acceptable limits, as determined by outdoor ambient air temperature and humidity sensors (not shown). Air entering through economizer damper 27 mixes with return air coming from zone 11 through return air duct 29, and is discharged into zone 11 through supply air plenum 30.

A control box mounted within the enclosure of temperature conditioning system 10 is indicated by reference numeral 35. Mounted in zone 11 is a temperature sensor and means for establishing a zone setpoint 36. In the preferred embodiment, the setpoint means comprises an analog variable resistance control. The setpoint can also be input from an optional digital keypad/display 34 disposed in the zone, or from a building automation system that may include a separate external computer and keyboard. Electrical leads 37 connect the zone sensor/setpoint means 36 with control 35. A temperature sensor 15 is exposed to the supply airstream, mounted in the supply air duct 30. Sensor 15 is connected to control 35 by means of leads 16. Alternatively, an average supply air temperature may be determined using a plurality of temperature sensors such as sensor 15. Control leads 38a through f, connect the control 35 to each of the operating components in temperature conditioning system 10, including compressors 12 and 13, indoor fan motor 26, economizer actuator 28, outdoor fan motor 24, and heating elements 14, respectively. Leads 38 represent control lines for actuating relays or contactors (not shown) capable of handling the supply current to each of these components. These leads also include conductors that carry signals for indicating contactor operation, using auxiliary switches provided in the contactors. Details of the contactor mechanism and auxiliary switches are not shown since they are well known to those skilled in the art.

Figure 2:
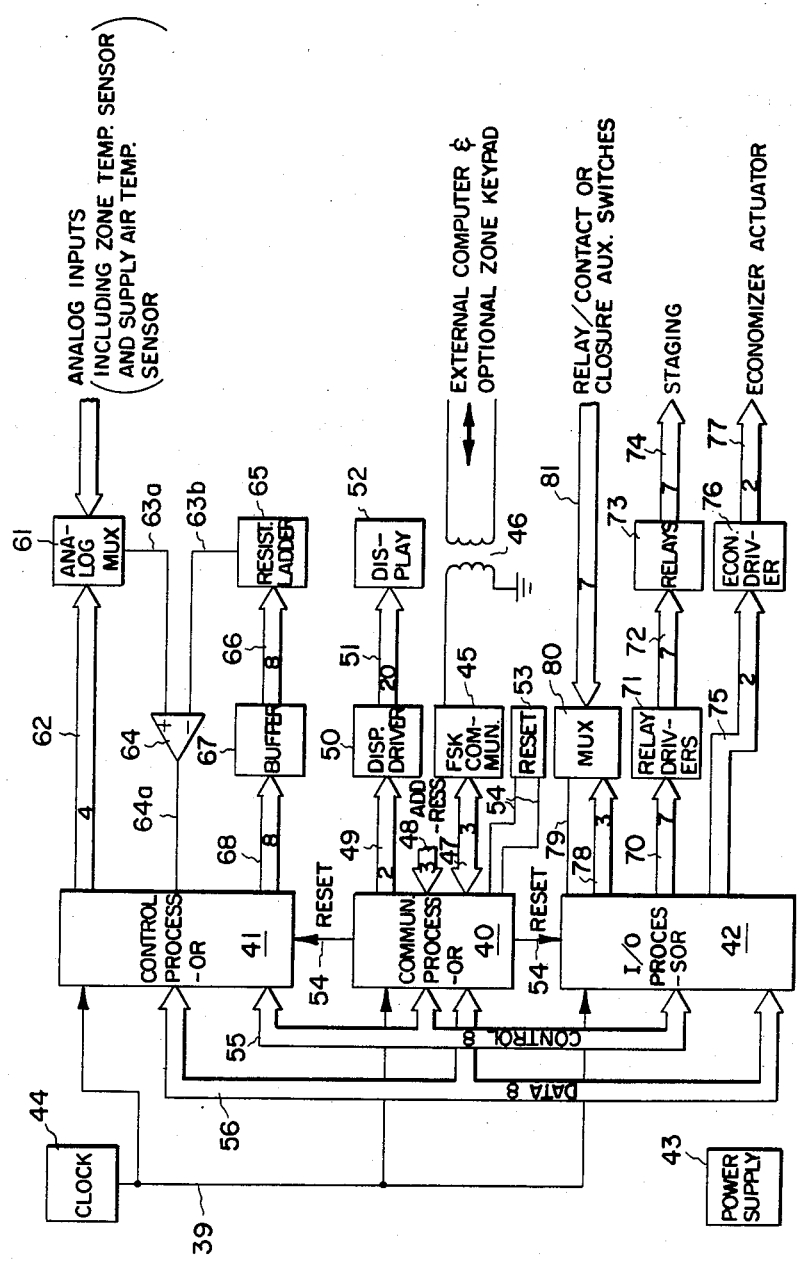
FIG. 2 is a block diagram of the microprocessor based control used to control temperature conditioning system of FIG. 1.

Turning now to FIG. 2, a block diagram of the elements comprising the preferred embodiment of control 35 shows that it includes three microprocessors. Each microprocessor has a separate function, however it would also be possible to combine all control functions into a single microprocessor, given sufficient memory. Microprocessor 40 handles communications and operates as a master control over microprocessors 41 and 42. Processor 41 is labeled as a control processor since it functions to control the stages of temperature conditioning according to the control logic of the subject invention. Processor 42 is used for handling input and output of signals relative to the active elements of temperature conditioning system 10 via control leads 38. It also receives signals from the auxiliary switches in the contactors energized by control 35. Each microprocessor 40 through 42, and other active circuitry in control 35 is supplied with an appropriate DC voltage from DC power supply 43. These voltages comprise regulated levels of +5 and +10 VDC in the preferred embodiment. The processors are also linked via leads 39 to a master clock 44 which uses a quartz crystal as a time base to supply a common timing frequency to each processor.

Communications processor 40 is considered the master in the control scheme, since it is responsible for communication between the other two processors 41 and 42 and with an external building automation system computer (not shown). The external computer is interfaced to communications processor 40 through a frequency shift keying communication module 45, and a transformer 46 which provides both isolation and impedance matching to a data transmission line. The frequency shift keying communications module 45 in combination with processor 40 modulates digital data supplied from the control 35 using two substantially different carrier frequencies to represent binary 1's and 0's, and demodulates data from the external computer received at those two frequencies. A three conductor connection 47 between communications module 45 and microprocessor 40 serves to convey these signals bidirectionally. Leads 48 also provide a means for inputting an address from a digi-switch (not shown) or from jumpers that may be set (or cut) to identify a particular control 35, assuming that other devices are connected to the external computer via the data transmission line. Microprocessor 40 is also connected by leads 49 to a display driver 50, which in turn is connected via leads 37 to display 51, co-located with zone sensor/setpoint means 36. A power-on reset module 53 is connected via leads 54 to communication processor 40 and to each of the processors 41 and 42. The purpose of the reset module 53 is to initialize the processors 40–42 whenever power is first applied to control 35.

Analog inputs, including the input from zone temperature sensor 36 on leads 37 and from the supply air temperature sensor 15 on leads 16, are connected to an analog multiplexor 61. Multiplexor 61 responds to an input select signal coming from control processor 41 via leads 62. This signal causes the analog multiplexor 61 to pass a selected analog input via leads 63a. The selected analog input signal on leads 63a is connected to a non-inverting input on comparator 64 for comparison to a voltage applied via leads 63b to the inverting input of comparator 64; this comparison voltage on leads 63b is derived from a resistance ladder network 65. The voltage on leads 63b is controlled by signals output from control processor 41 over leads 68. These signals pass through a buffer 67, the output of which is connected to the ladder network 65 by leads 66. In effect, control processor 41 selects a successively lower comparison voltage for input to comparator 64 by closing switches on resistor ladder network 65 until the output from comparator 64 indicates that the voltage level on input 63b is approximately equal to the voltage on the select analog input 63a. This technique for analog-to-digital conversion is well known to those skilled in the art as the R-2R conversion scheme, because of the relative magnitude of resistance values used in the ladder circuit.

Sensors 36 and 15 typically comprise thermistors having a resistance proportional to the zone temperature and supply air temperatures, respectively. Assuming that control processor 41 has selected the analog input from the zone temperature sensor 36, it is thus able to determine the voltage drop across the sensor. By reference to the digital signal applied to resistor ladder 65 via control lines 68 and 66, processor 41 determines the digital equivalent for the analog voltage level that is proportional to the temperature in zone 11. A similar method is used to determine a digital value for the supply air temperature.

Microprocessor 40 through 42 communicate control signals bi-directionally over control leads 55, and pass data bi-directionally over data lines 66. This permits information that is available to any one of the microprocessors to be accessed by either of the other two. For example, each of the analog inputs reaching the multiplexor 61, when selected by control processor 41 and converted to a digital level, can be output to an external computer through communications processor 40 and FSK communication module 45. Likewise, if an external computer is used to enter data such as a zone setpoint temperature, that data can be made available to the control processor 41 by the communications processor 40. Digital display 52 can be used by the operator to read the zone temperature setpoint, the zone temperature, and other variables available to the control 35 and is located either on optional keypad setpoint means 34 or directly on control 35.

Once a control action such as a change in staging is adopted, signals passing over control lines 55 cause the input/output processor 42 to act on the data present on data lines 56, and to produce a corresponding logic level signal on lines 70. Lines 70 control relay drivers 71, the outputs of which are connected via leads 72 to the relays 73. Operation of relays 73 cause the contactors for the appropriate elements in the temperature conditioning system 10 to be energized or de-energized accordingly. The I/O processor 42 determines if a specific contactor has been actuated by feeding an input select signal over line 78 to multiplexor 80. The output from multiplexor 80 comprises the signal from the selected contactor auxiliary switch input to multiplexor 80 via leads 81.

The economizer actuator 28 is driven via logic level signals on lines 75 connected to an economizer drive 76. The higher current levels required by the economizer actuator 28 are sourced by economizer driver 75 and supplied over lines 77 to the actuator 28.

The functions performed by processors 40 through 42 are determined by a machine language program stored in internal read only memory (ROM) within each processor. In the preferred embodiment, all three microprocessors are NEC Model 8049 integrated circuits and each includes 2K bytes of internal memory (ROM). These microprocessors also each include 128 bytes of random access memory (RAM). Responsibility for energizing and de-energizing stages of temperature conditioning resides in programs stored in the ROM of control processor 41. Other functions performed by control 35 are also stored as programs in the ROM of processor 41, and it is by distributing the responsibility for communications and input/output to processors 40 and 42, that control processor 41 is freed to perform these other functions. As noted above, the control functions and algorithms of the subject invention may also be carried out in a single microprocessor or by using other combinations of microprocessors with similar characteristics.

Under normal ambient and comfort zone conditions, the cooling mode of system 10 that is provided by operation of compressors 12 and 13 (or by cool outdoor ambient air entering the unit through economizer damper 27), and the heating mode provided by operation of electric heaters 14 is controlled in response to the comfort zone temperature. A machine language program stored in the ROM of microprocessor 41 implements a primary algorithm to control the heating and cooling stages to meet a temperature conditioning demand, in response both to the deviation of the zone 11 temperature from the heating or cooling setpoint and to the rate of change of the zone temperature. The details of this primary control algorithm are disclosed within the specification of commonly assigned U.S. patent application, Ser. No. 06/557,983, which is specifically incorporated herein by reference. The control of temperature conditioning 10 is not limited to the primary algorithm defined in the application referenced above; any staging control that responds to the deviation of the zone temperature from a setpoint is equally applicable as a primary control means within the scope of the subject invention as claimed.

Figure 3:
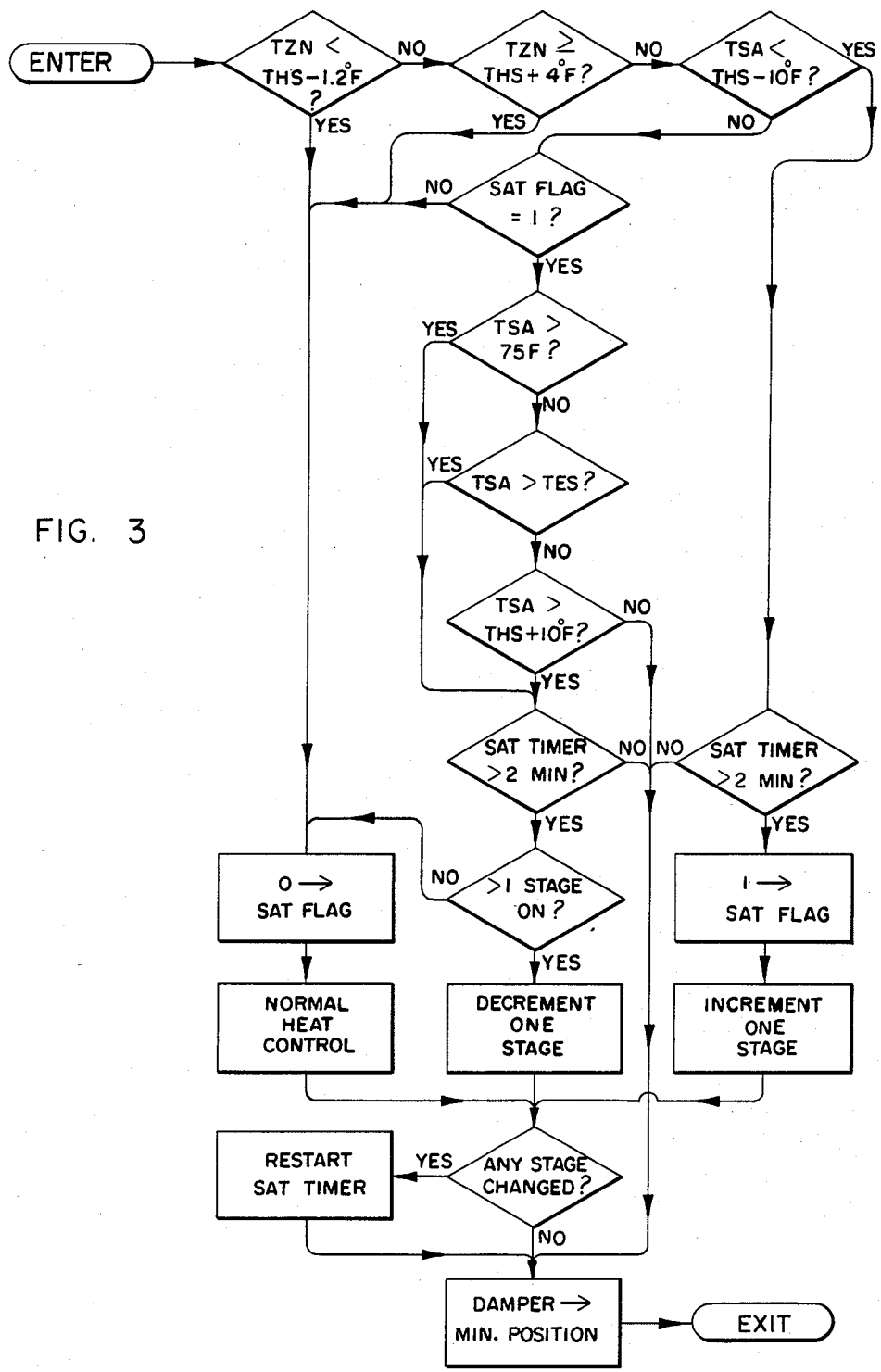
FIG. 3 flow chart illustrating the control logic for supply air tempering when the system is operating in a heating mode.

Turning now to FIG. 3, the control logic for implementing supply air tempering when system 10 is operating in the heating mode is illustrated with a flow chart. Abreviations used in the flow chart are as follows:

TZN = Comfort Zone Temperature;
TAS = Heating Setpoint;
TSA = Temperature of Supply Air;
SAT = Supply Air Tempering; and
TES = Economizer Setpoint Temperature.

Initially the control logic determines if TZN is more than 1.2° F. below the heating setpoint temperature THS, and if so, assigns a 0 value to the supply air tempering flag. The SAT flag is a binary indicator that shows whether or not a system is operating under the control of the supply air temperature algorithm. When SAT equals 0, supply air tempering is not permitted, and the heating stages are controlled according to the normal or primary algorithm to satisfy the comfort zone heating demand. After effecting the primary control algorithm, program logic determines if there has been a change in staging and, if not, control 35 drives the damper actuator 28 to close the economizer damper 27 to its minimum position before exiting the routine. If there has been a change in staging, a supply air tempering timer is restarted to initialize a two-minute delay period during which heating stages may not be energized or de-energized to satisfy the requirement for supply air tempering. Thereafter, program logic again reaches the point of causing the economizer damper 27 to close to its minimum position before exiting the routine. The supply air tempering timer comprises an internal counter in control microprocessor 41 that counts clock cycles derived from clock 44 until a predefined count indicates an interval of time has elapsed.

Assuming that the zone temperature is not more than 1.2° below the heating setpoint, control logic determines if the zone temperature is 4° F. or more greater than the heating setpoint. This indicates a condition in which supply air tempering would cause too great a temperature rise in the zone and therefore should not be allowed. Consequently, if this condition exists, the control proceeds along the same logic path to enable the primary heat control algorithm as previously discussed. On the other hand, if TZN is not greater than or equal to THS+4°, there is a further check to determine if the supply air temperature is more than 10° below the heating setpoint. If so, and if the supply air tempering timer has totalled more than two minutes since the last change in staging, a 1 is assigned to the SAT flag, and an additional stage of heating is energized by control 35. Since this results in a change in staging, the SAT timer is restarted prior to setting the economizer damper 27 to a minimum position and exiting the routine.

If TSA is not less than THS−10° F., program logic checks to determine if the SAT flag has been set to 1, and if not, proceeds with the normal primary heating control algorithm. Alternatively, a further series of conditions are checked to see if a stage of heating should be de-energized. These conditions include a determination of whether the supply air temperature is greater than 75° F.; a determination of whether the supply air temperature exceeds an economizer setpoint (explained hereinbelow); and a check of whether the supply air temperature is more than 10° above the heating setpoint temperature. An affirmative answer to any one of these conditions causes control 35 to de-energize a stage of heating if more than two minutes have elapsed since the last change and more than one stage of heating has been previously energized. A negative response to all of these conditions results in program logic dropping to the instruction block at the bottom of the flow chart where the economizer dampers 27 are moved to the minimum position, prior to exiting the routine. That result also occurs if the SAT timer has not accumulated at least two minutes since the last change in staging.

Assuming that the conditions discussed hereinabove would otherwise cause a stage of heating to be de-energized, this action is not allowed to happen unless at least two stages are in operation. If less than two heating stages are energized, the primary control algorithm resumes control of the system after assigning a 0 to the SAT flag. It should be clear from the above, that supply air tempering may be reduced if the supply air temperature substantially exceeds the zone heating setpoint (by more than 10°), or if the supply air temperature exceeds the economizer setpoint temperature. The economizer setpoint temperature (TES) is a setpoint compared to the temperature in the zone to determine if control 35 should cause the heating mode to be terminated, and outdoor ambient air flow through the economizer dampers 27 increased to provide cooling in zone 11. The value of TES is usually set several degrees above the heating setpoint temperature. Should the supply air temperature significantly exceed the economizer setpoint due to supply air tempering, system 10 might leave the heating mode even though the zone temperature would indicate a need to remain in the heating mode. For the same reason, the last stage of heating that is energized cannot be de-energized by the secondary control means provided for supply air tempering; only the primary control algorithm can de-energize the last stage of heating that remains on.

Figure 4:
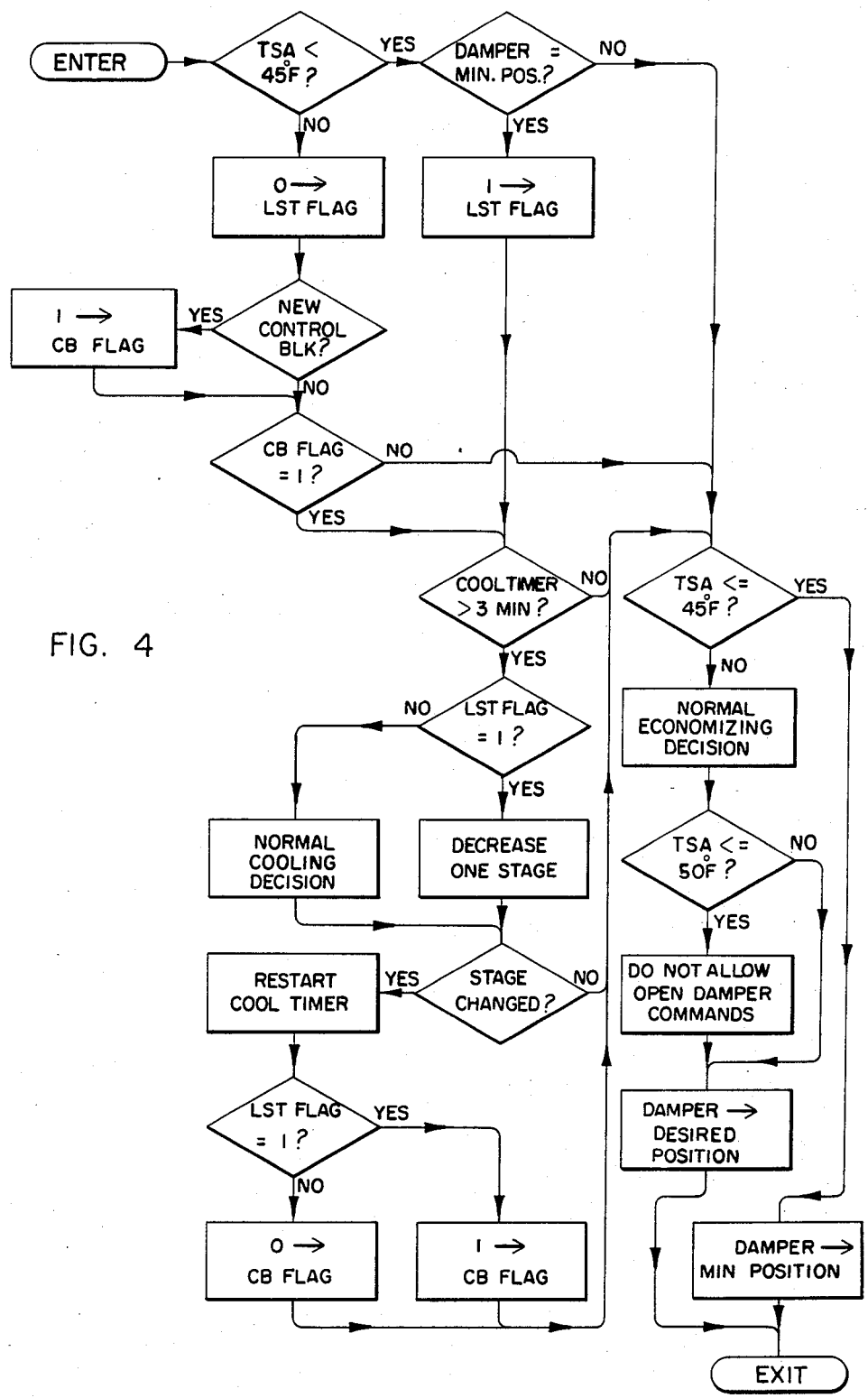
FIG. 4 is a flow chart illustrating the control logic for supply air tempering when the system is operating in a cooling mode.

A flow chart illustrating the control logic for supply air tempering while system 10 is operating in the cooling mode is shown in FIG. 4. The abbreviations used in this flow chart are as follows:

TSA = The Temperature of Supply Air;
LST = The Low Supply Temperature Condition; and
CB = Control Block Upon entry into the routine, the program logic checks to see if the supply air temperture is less than 45° F., and if not, assigns a 0 to the LST flag. Thereafter, the program determines the status of the normal or primary control algorithm relating to operation of the system in the cooling mode by checking to see if a new control block has been entered as a result of the deviation of the comfort zone temperature from the cooling setpoint. The concept of "control blocks" is defined in the above referenced patent application, as a plurality of predetermined ranges for the deviation of the zone temperature from the setpoint, with associated limits for the rate of temperature change that determine a specific change in staging. If a new control block range has been entered, a 1 is assigned to the CB flag. This insures an affirmative response to the next program inquiry, to determine if the CB flag equals 1. Further, if a new control block had not been entered, the program also checks the status of the CB flag.

If the CB flag is equal to 1, the program logic thereafter checks the condition of the cool timer to determine if more than three minutes has elapsed. The cool timer is a counter incorporated in microprocessor 41 and uses the time base frequency from clock 40 as previously described for the SAT timer. Assuming that more than three minutes have elapsed since the last change in cooling staging, the program determines if the LST flag is equal to 1, and if so, de-energizes one stage of cooling. The number of stages of cooling that are energized is thus decreased by one stage in the condition wherein the LST flag indicates that the supply air temperature is less than the 45° F. and that the economizer damper 27 is at its minimum position. The occurrence of these two conditions causes a 1 to be assigned to the LST flag. However, if the supply air temperature is not less than 45° F., the LST flag has a value of 0, and program logic permits the primary control algorithm for cooling to control the operation of the cooling stages.

If a stage of cooling is de-energized either by the primary control algorithm or as a result of supply air tempering, the cool timer is restarted. If the stage was de-energized as a result of supply air tempering, as indicated by the condition of the LST flag, a value of 1 is assigned to the CB flag; otherwise, a value of 0 is assigned.

Several branches of the supply air tempering routine for the cooling mode combine on the right side of the flow chart at the point preceding a determination of whether the supply air temperature is less than or equal to 45° F. From the top of the flow chart, where it is determined that the supply air temperature is less than 45° F. and that the economizer damper 27 is not in its minimum position, program logic proceeds to the lower right-hand instruction block wherein the economizer damper is moved to its minimum position, before exiting the routine. If either the CB flag is not equal to 1, or the cool timer has not accumulated three minutes, or there has not been a change in staging by the primary control algorithm, program logic determines if the supply air temperature is less than or equal to 45° F. The same action is taken after the CB flag is set to either a 1 or 0 (on the bottom left side of the flow chart). Assuming that the supply air temperature exceeds 45° F., the primary control algorithm adjusts the position of the economizer damper 27 as a function of the comfort zone temperature assuming that the humidity and temperature of the outdoor ambient air within acceptable limits. However, if the supply air temperature is less than or equal to 50° F., program logic does not permit economizer damper 27 to open further. Should the supply air temperature exceed 50° F., the damper is permitted to move to the position determined by the primary control algorithm, before exiting the routine. The affect of the preceding program logic is to prevent an *increase* in the use of cold outdoor ambient air for cooling zone 11 if the supply air temperature is already less than or equal to 50° F. However, the economizer damper 27 is allowed to close further if required by the primary control algorithm.

By providing a secondary control algorithm to effect supply air tempering, the subject invention avoids chilling personnel in comfort zone 11 as a result of uncomfortably cold air from temperature conditioning system 10 being discharged into the zone. It should be apparent, however, that the secondary control algorithm is only allowed to override the primary control if certain conditions are met which tend to guarantee that supply air tempering does not unduly raise the comfort zone temperature above the setpoint.

Although the subject invention has been disclosed with respect to a preferred embodiment, modifications to the preferred embodiment as disclosed hereinabove will be readily apparent to those skilled in the art, and such modifications should lie within the scope of the present invention as defined in the claims which follow.

We claim:

1. In a system having a plurality of temperature conditioning stages that may be selectively energized so the capacity of the system may be varied to maintain a comfort zone at a setpoint temperature, a control for tempering air supplied to the zone to prevent personal discomfort to occupants of the zone due to excessively cold air being supplied to the zone, said control comprising:
   a. a supply air temperature sensor;
   b. a comfort zone temperature sensor;
   c. primary control means responsive to the comfort zone temperature sensor, for controlling the capacity of the temperature conditioning system by selectively energizing stages of temperature conditioning to maintain the comfort zone at the setpoint temperature; and
   d. secondary control means, responsive to the supply air temperature sensor, for preventing excessively cold air being supplied to the zone by overriding the primary control means and controlling the capacity of the temperature conditioning system to increase the supply air temperature if it should fall below a predetermined minimum value lying in the range from 40° F. to 55° F.

2. The control of claim 1 wherein the system includes a plurality of heating stages that may be selectively energized to vary the system temperature conditioning capacity.

3. The control of claim 2 wherein the secondary control means are inoperative to override the primary control means if the comfort zone temperature is more than a predetermined increment below the comfort zone setpoint temperature.

4. The control of claim 2 wherein the secondary control means are inoperative to de-energize a stage of heating if the supply air temperature is substantially less than the comfort zone setpoint temperature.

5. The control of claim 2 wherein the secondary control means are inoperative to override the primary control means if the comfort zone temperature is substantially greater than the comfort zone setpoint.

6. The control of claim 2 wherein the secondary control means are operative to change the number of heating stages that are energized only after a predetermined time interval has elapsed since the last change in the number of temperature conditioning stages that are energized.

7. The control of claim 2 wherein a heating stage energized by the secondary control means is de-energized after the supply air temperature substantially exceeds the comfort zone setpoint temperature.

8. The control of claim 7 wherein the secondary control means are inoperative to de-energize all the heating stages in response to the supply air temperature substantially exceeding the comfort zone setpoint temperature, to insure that at least one of the heating stages remains energized to heat the comfort zone to the setpoint temperature as determined by the primary control means.

9. The control of claim 1 wherein the system includes a plurality of cooling stages that may be selectively energized to vary the system temperature.

10. The control of claim 9 wherein the system further includes economizer means for admitting and controlling the flow of outdoor ambient air into the comfort zone and wherein the secondary control means are operative to cause said economizer means to close to a minimum flow position if the supply air temperature is less than the predetermined minimum value.

11. The control of claim 10 wherein the secondary control means are operative to inhibit the primary control means from causing the economizer means to increase the flow of outdoor ambient air into the comfort zone when the supply air temperature is between the predetermined minimum value and a substantially higher predetermined temperature.

12. The control of claim 9 wherein the secondary control means are inoperative to change the number of cooling stages that are energized until a predetermined time interval has elapsed since the last change in the number of temperature conditioning stages that are energized.

13. In a system having a plurality of heating and cooling stages that may be selectively energized in a heating mode or in a cooling mode to temperature condition a comfort zone to a setpoint temperature, a control for tempering air supplied to the zone, said control comprising:

a. a supply air temperature sensor;

b. a comfort zone temperature sensor;

c. primary control means responsive to the comfort zone temperature sensor for placing the system in the heating or cooling mode and selectively energizing one or more of either the heating stages or the cooling stages to maintain the comfort zone at the setpoint temperature; and d. secondary control means for overriding the primary control means to increase the supply air temperature if it should fall below a predetermined minimum value by energizing an additional stage of heating in the heating mode, and by de-energizing a stage of cooling in the cooling mode.

14. The control of claim 13 wherein the primary and secondary control means comprise a microprocessor and memory means for storing program instruction.

15. The control of claim 13 wherein the system further includes economizer means for admitting and controlling the flow of outdoor ambient air into the comfort zone, and wherein during operation in the cooling mode, the secondary control means are operative to increase the supply air temperature by first causing the economizer means to reduce the flow of outdoor ambient air into the comfort zone before de-energizing a stage of cooling.

16. The control of claim 15 wherein during operation of the system in the cooling mode, the secondary control means are operative to inhibit the primary control means from causing the economizer means to increase the flow of outdoor ambient air into the comfort zone when the supply air temperature is between the predetermined minimum value and a substantially higher predetermined temperature.

17. The control of claim 13 wherein the secondary control means are inoperative to change the number of stages of heating or cooling that are energized until a predetermined time interval has elapsed since the last change in the number of stages that are energized.

18. The control of claim 13 wherein operation of the secondary control means to override the primary control means while the system is in the heating mode also depends on the comfort zone temperature and the comfort zone setpoint temperature.

19. The control of claim 13 wherein the secondary control means are operative to de-energize a heating stage if one of the following conditions is met:

a. the temperature of the supply air exceeds a predetermined maximum value; or b. the temperature of the supply air is substantially greater than the comfort zone setpoint temperature.

20. The control of claim 13 wherein during operation of the system in the heating mode, the predetermined minimum value is defined as a predefined increment below the comfort zone setpoint temperature.

21. In a system having a plurality of temperature conditioning stages that may be selectively energized to maintain a comfort zone at a setpoint temperature, a method of controlling the stages for tempering air supplied to the zone to prevent personal discomfort to occupants of the zone due to excessively cold air being supplied to the zone, said method comprising the steps of:

a. sensing the supply air temperature;

b. sensing the comfort zone temperature;

c. in response to the comfort zone temperature, selectively energizing stages of temperature conditioning to maintain the comfort zone at the setpoint temperature according to a primary control; and d. preventing excessively cold air being supplied to the zone by overriding the primary control and controlling the stages of temperature conditioning to increase the supply air temperature if it should fall below a predetermined minimum value lying in the range from 40° F. to 55° F.

22. The method of claim 21 wherein the system is selectively operable in both a heating and cooling mode and includes a plurality of heating stages and a plurality of cooling stages.

23. The method of claim 22 wherein during operation of the system in the heating mode, the primary control controls the heating stages regardless of the supply air temperature if the comfort zone temperature is more than a predetermined increment below the comfort zone setpoint temperature.

24. The method of claim 21 wherein the system includes economizer means for admitting and controlling the flow of outdoor air into the comfort zone, further comprising the step of inhibiting the primary control from causing the economizer means to increase the flow of outdoor ambient air into the comfort zone when the supply air temperature is between the predetermined minimum value and a substantially higher predetermined temperature.

25. The method of claim 21 further comprising the step of delaying a change in the number of stages of temperature conditioning that are energized until a predetermined time interval has elapsed since the last change in the number of temperature conditioning stages that are energized.

* * * * *